Patented May 21, 1940

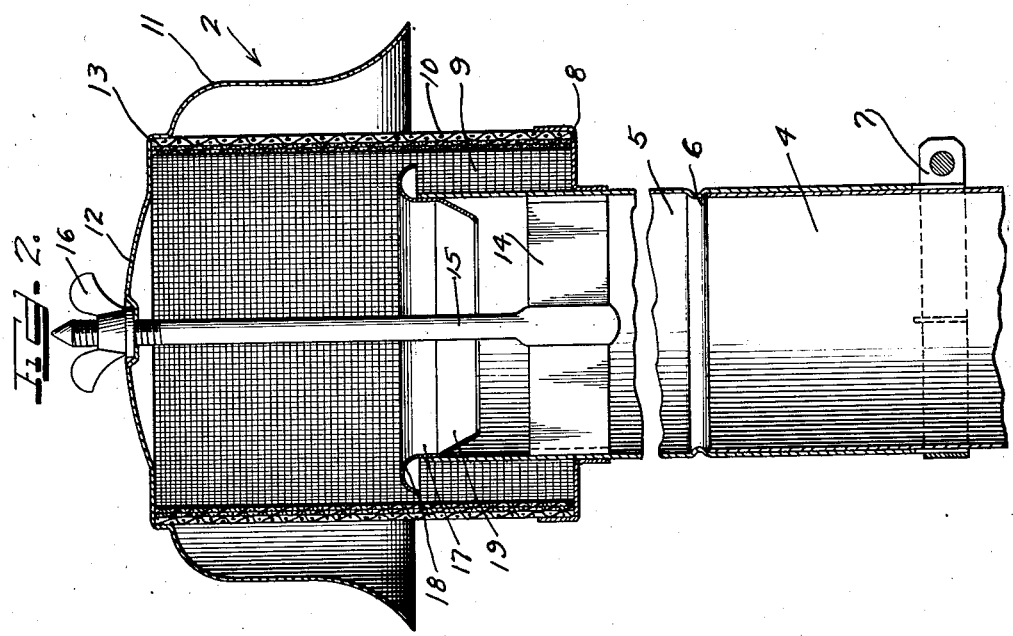
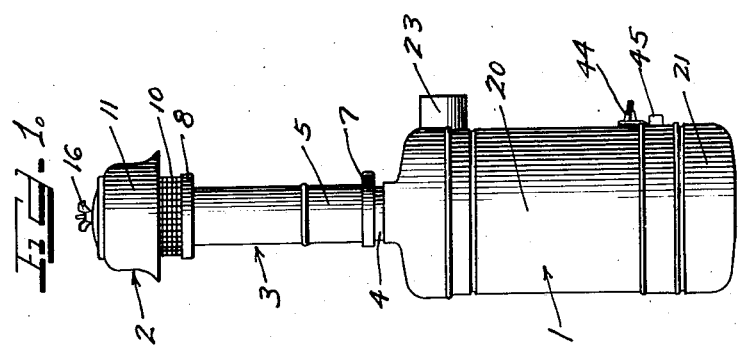

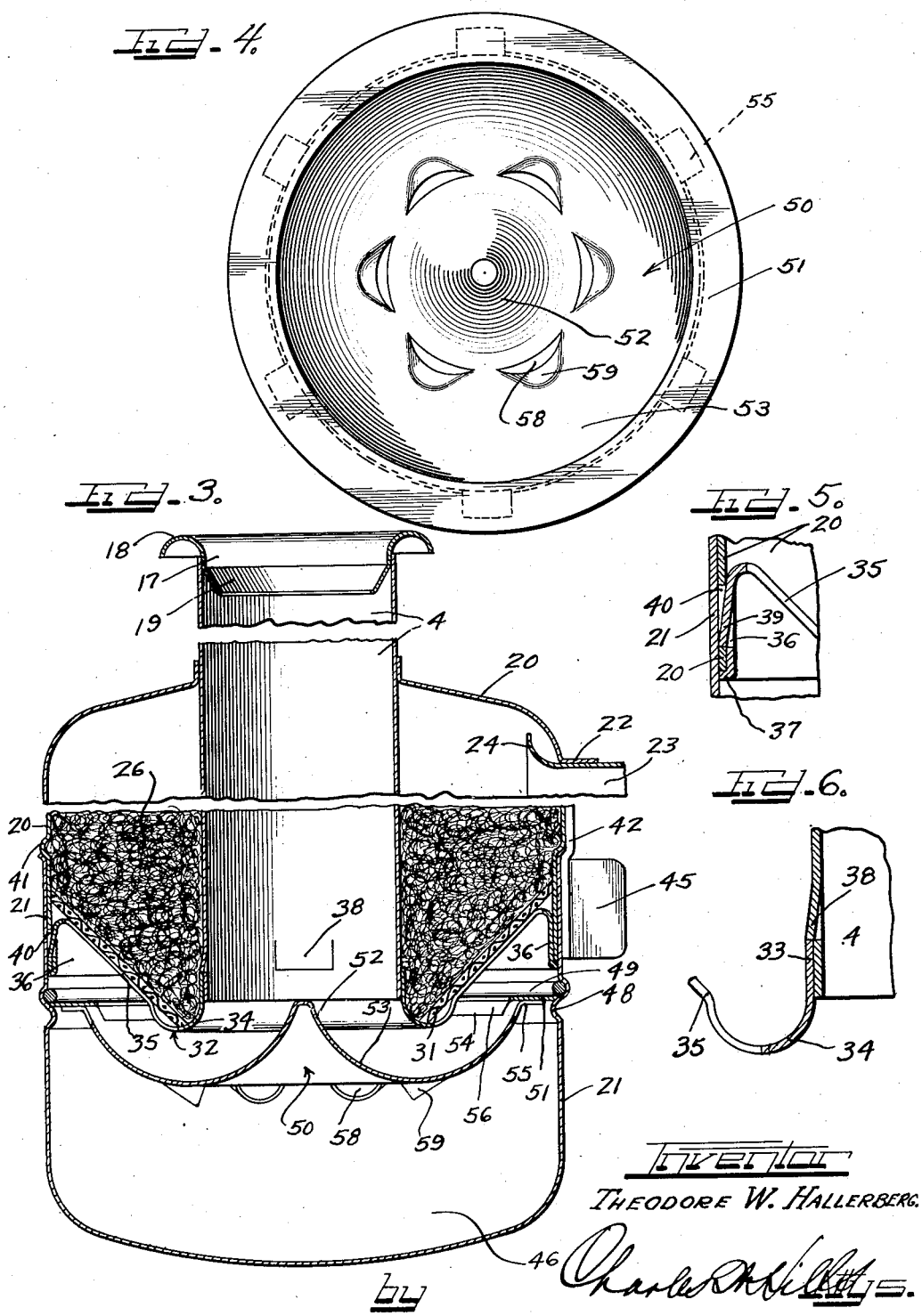

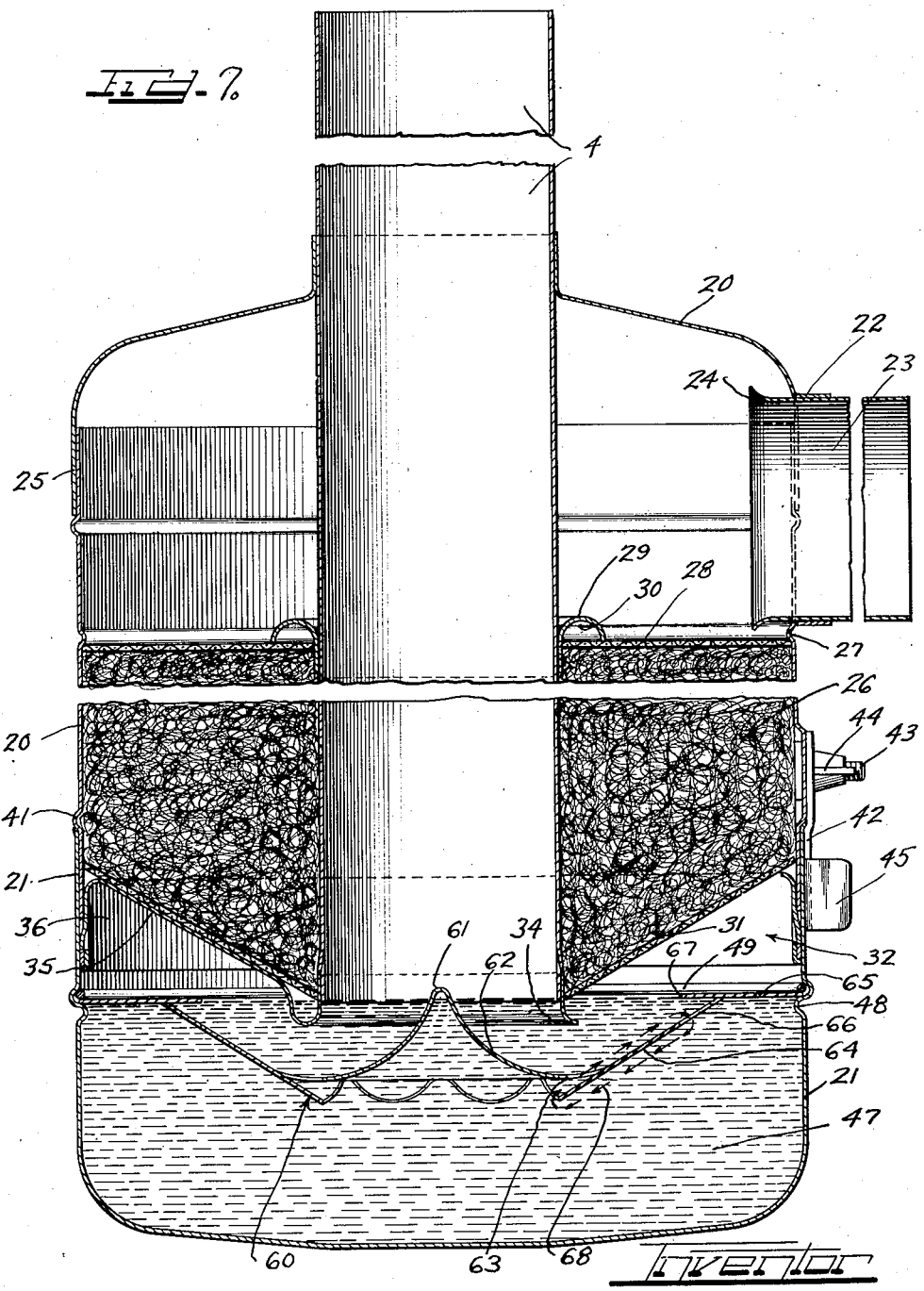

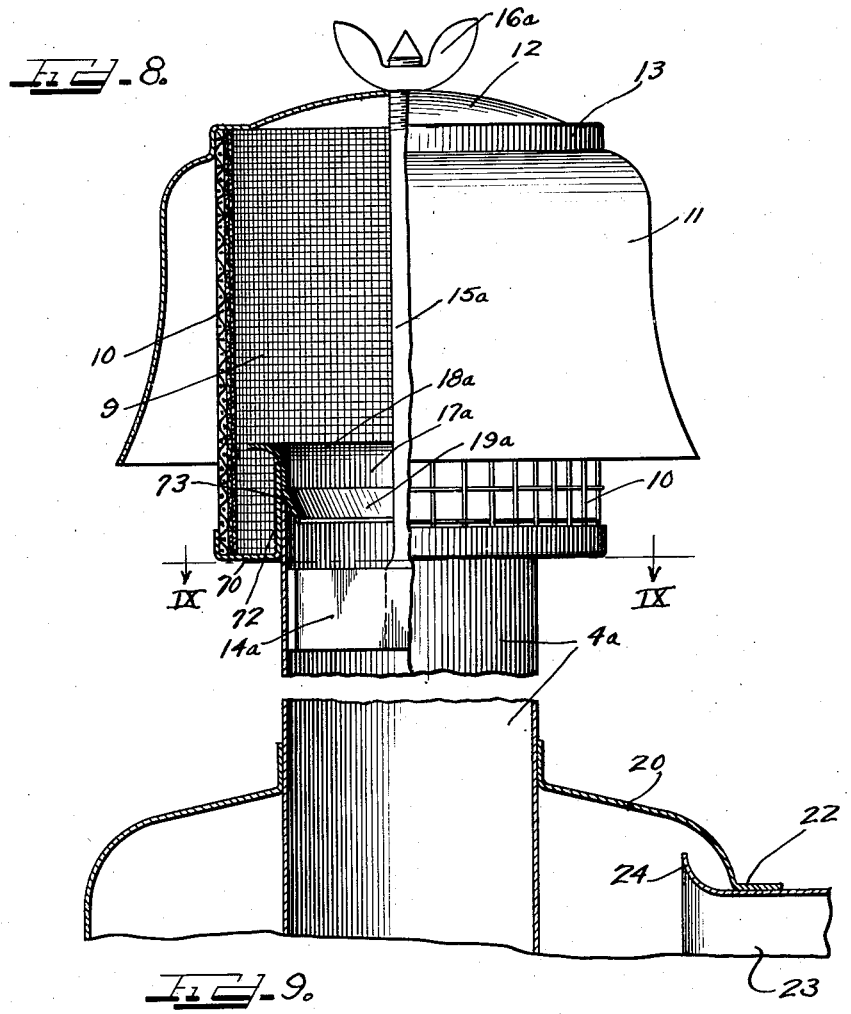
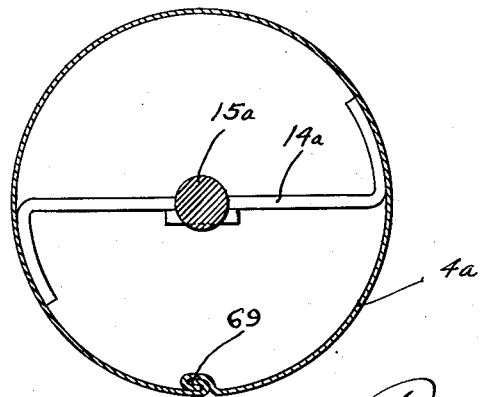

2,201,650

UNITED STATES PATENT OFFICE 2,201,650

AIR CLEANER

Theodore W. Hallerberg, Chicago, Ill., assignor, by mesne assignments, to United Specialties Company, Detroit, Mich., a corporation of Delaware Application December 14, 1936, Serial No. 115,659

15 Claims. (Cl. 183—15)

This invention relates to improvements in air cleaners, and more particularly to air cleaners of the combination liquid bath and filter type, wherein the air is commingled with a cleansing liquid to remove the major portion of impurities carried by the air, and then filtered to remove the finer impurities and the cleansing liquid prior to the exit of cleaned air, the invention being highly desirable for use in connection with internal combustion engines, although the invention may be used for air compressors or other mechanisms or locations wherein a supply of cleaned air is desirable, and the invention will have other uses and purposes as is apparent to one skilled in the art.

An object of this invention is the provision of an air cleaner which, for the same capacity, may be made smaller in size than any cleaner heretofore developed of which I am aware.

It is also an object of this invention to provide an air cleaner which may carry a high liquid level without a pull-over of liquid through the outlet of the cleaner, and which may also carry a low liquid level with high efficiency.

The invention also embodies an air cleaner including baffle means associated with a sump for a cleansing liquid, the arrangement being such that the baffle means are constantly wet during operation without danger of pull-over of cleansing liquid through the cleaner outlet.

Another object of the invention is the provision of an air cleaner having an internal construction such that a quantity of cleansing liquid is held in position so as to completely seal off the air passage through the cleaner, but when the cleaner is associated with an internal combustion engine or other mechanism creating a suction, the cleaner almost instantaneously operates at high efficiency, said quantity of liquid being deposited almost in its entirety in the filter mass above the liquid sump as soon as the engine is operating.

A further object of the invention is the provision of an air cleaner having a liquid sump for cleansing liquid, with a baffle disposed adjacent the sump and so shaped as to guide incoming air through the cleaner, the baffle having separate sets of openings, one set being positioned for eduction of liquid from the sump, and the other set being positioned for return therethrough of liquid to the sump, there being scoop means associated with the latter set of openings.

The invention also provides an air cleaner having a central inlet through the top of the cleaner, the inlet conduit extending well down into the cleaner adjacent the liquid sump, and a baffle construction associated with the sump and having a central peaked portion adjacent the inner end of the inlet to aid in guiding the air properly through the cleaner and providing the proper actuation of sump liquid.

The cleaner herein set forth also embodies novel restriction reducing features, various major openings within the cleaner structure being formed with a bell or funnel shape to reduce restrictions.

It is also an object of the invention to provide an air cleaner incorporating structural features, such as to permit various parts of the cleaner to be readily assembled in substantially permanent manner by merely placing the parts in proper relative position, there being no need for welding and similar joining operations, or the use of bolts, rivets and the like.

Air cleaners used on farming tractors are frequently provided with an inlet conduit of sufficient length to extend above the hood of the tractor into a zone of pure air, and frequently the upper end of the inlet pipe is provided with a structure which may be termed a pre-cleaner, to prevent the entrance of pine needles, chaff and the like into the cleaner proper, such substances, if permitted to enter the body of the cleaner and become moistened by the cleansing liquid frequently resulting in a clogging of the cleaner, or at least in an objectionable rise in restriction. While a pre-cleaner is practically essential in some localities of use, pre-cleaners heretofore have resulted in a lowering of the available engine horse power. There is a certain dissipation of horse power with the use of a liquid bath air cleaner of the proper capacity for the particular engine. Heretofore, the use of a pre-cleaner added materially to the dissipated horse power causing a further loss of horse power available for operating purposes.

With this in mind, it is an important object of the present invention to provide an air cleaner equipped with a novel pre-cleaner construction which adds substantially nothing to the dissipated horse power; in other words, a novel pre-cleaner affording no restriction.

Also an object of the invention is the provision of an air cleaner equipped with a pre-cleaner construction not only efficient to remove chaff and similar debris carried by surrounding air, but also capable of functioning as a weather cap to prevent the entrance of atmospheric moisture into the cleaner.

Still another feature of the invention is the provision of a liquid retainer in the inlet conduit of the cleaner to prevent an unwelcome expulsion of cleansing liquid in the event of back fire through the cleaner from an internal combustion engine with which the cleaner is operated.

Also a feature of the invention is the provision of an air cleaner having a new and novel baffle construction capable of contributing in no mean way to the high efficiency of the cleaner.

The air cleaner embodied in this invention includes a liquid sump with a filter mass disposed thereabove, and the internal construction of the cleaner is such as not only to guide the air properly through the cleaner and insure an initial and substantial cleansing of the air by sump liquid, but also to cause a substantially immediate impregnation of the filter mass to a desired extent, and the retention of that proper degree of impregnation throughout an exceedingly wide horsepower range of the engine, including all normal operating speeds of the engine.

The present invention also provides a novel pre-cleaner construction which is very economical to manufacture and may be easily associated with an air cleaner merely by placing the pre-cleaner on the inlet conduit of the air cleaner and actuating a simple adjustable holding element.

While some of the more salient features, characteristics and advantages of the present invention have been above pointed out, others will become apparent from the following disclosures, taken in conjunction with the accompanying drawings, in which:

Figure 1 is a side elevational view of an air cleaner equipped with a pre-cleaner, all embodying principles of the present invention;

Figure 2 is an enlarged fragmentary vertical sectional view, with parts in elevation, through the pre-cleaner and associated inlet conduit structure seen in Figure 1;

Figure 3 is an enlarged fragmentary vertical sectional view through the main body portion of the cleaner;

Figure 4 is a plan view of the novel baffle construction seen in Figure 3, showing the same removed from the cleaner;

Figure 5 is an enlarged fragmentary sectional view taken from the central left hand portion of Figure 3 and illustrating a structural detail;

Figure 6 is an enlarged fragmentary sectional view taken from the inner left central part of Figure 3, illustrating another detail of construction;

Figure 7 is an enlarged vertical sectional view through a cleaner body similar to the structure shown in Figure 3 but illustrating a modified form of baffle construction;

Figure 8 is a fragmentary, part elevational, part sectional view of a combined pre-cleaner and air cleaner construction illustrating a modified form of attachment of the two parts; and Figure 9 is an enlarged plan sectional view through the inlet conduit of the cleaner taken substantially as indicated by the line IX—IX of Figure 8 looking in the direction of the arrows.

As shown on the drawings:

With reference to Figure 1, it will be seen that the illustrated embodiment of this invention includes an air cleaner proper generally indicated by numeral 1, a pre-cleaner construction generally indicated at 2 mounted on an inlet conduit structure 3 connecting the air cleaner and pre-cleaner and being of sufficient length to extend above the hood of a tractor or a similar vehicle.

The cleaner proper may be either as seen in Figure 3 or as seen in Figure 7, the showing in Figure 3 being preferable for the smaller sized cleaner and that of Figure 7 being preferable for a larger sized cleaner. By way of example and not limitation, the structure of Figure 3 is preferable for cleaners of six inches or less in diameter and the structure of Figure 7 is preferable in cleaners larger than six inches in diameter, practically the sole difference in construction, outside of size, residing in the baffle. Accordingly, with the exception of the two baffle constructions, all corresponding parts of the showings in Figures 3 and 7 will be designated by like reference numerals.

In this instance, the cleaner is provided with a center tube inlet 4, and as seen particularly in Figure 2, an outlet conduit 5 of the pre-cleaner 2 intimately telescopes over the inlet conduit 4, a bead 6 or equivalent structure on one of these conduits limiting the telescoping movement. The conduits 4 and 5 may be suitably joined together to hold the pre-cleaner in position by any satisfactory means, such as a circumscribing clamping element 7.

In addition to the conduit 5, the pre-cleaner 2 includes a flanged supporting ring 8 spot welded or otherwise secured to the conduit 5. Seated on this ring within the vertical flange thereof is a cylinder made up of a plurality of inner layers 9 of relatively fine mesh screen and an outer layer 10 of heavier mesh screen. A bell-shaped hood 11 having a closed top 12 and a shoulder formation 13 for engaging the screen cylinder holds the cylinder tightly in position on the ring 8. Inside the conduit 5, a cross yoke 14 is attached in any suitable manner, as by spot welding. Secured to this cross yoke is an upwardly extending bolt 15 which projects through a suitable aperture in the top 12 of the bell hood, and by means of a thumb nut 16 engaging this bolt, the hood may be clamped down upon the screen cylinder.

It has been found in the use of air cleaners that the cleaner itself subtracts from the effective horsepower of the internal combustion engine with which it is associated. Heretofore, the use of a pre-cleaner has caused a further and material detraction from the effective horsepower. In some localities, a pre-cleaner is absolutely essential because regardless of the efficiency of the air cleaner, the amount of dirt at the level of the air cleaner is considerably greater than the amount of dirt carried by air in the strata of the pre-cleaner. Therefore, with the cleaner operating at the same efficiency, there still will be less impurities to reach the engine if the air is taken into the cleaner from the strata of the pre-cleaner, and in addition, such debris as pine needles, chaff and the like, which would tend to clog the air cleaner proper, are removed by the pre-cleaner without any clogging action.

By way of example, and not by way of limitation, it has been found by tests under what may be termed normal conditions requiring the use of a pre-cleaner, that the air cleaner itself results in the loss of approximately 4 horsepower of an engine capable of giving 100 horsepower. Heretofore, the addition of a pre-cleaner has resulted in a further loss of three additional horsepower, making a total loss of 7 horsepower, leaving only 93 effective horsepower of the engine. This loss caused by the pre-cleaner alone is substantially due to restriction in the pre-cleaner.

The pre-cleaner embodied in the present invention results in practically no loss of horsepower.

For example, under tests, it has been found that the restriction of the pre-cleaner herein set forth amounts to two-tenths of one inch of water, and that under a severe test. This restriction is so small a fraction of one horsepower as to be absolutely negligible. Therefore, a distinct and important advantage of the present invention is a provision of a construction of air cleaner and pre-cleaner which wholly results in no more loss of horse power than the air cleaner alone.

Accordingly, a highly important feature of construction of the precleaner shown in Figure 2 resides in the provision of a collar 17 telescopically associated with the upper end of the conduit 5 and secured thereto in any suitable manner, as by spot welding. It will be noted that the upper portion of this collar is formed as indicated at 18 into an arcuate bell-like mouth which reduces restriction to entering air substantially to zero, because it defines a smooth natural path for the course of the air without any sharp corners, as would be the case if the upper end of the conduit 5 were allowed to terminate in a square cut manner.

An additional feature of the collar resides in the provision of an integral liquid retaining portion 19 on the inner end of the collar. This portion slopes inwardly towards the center of the conduit 5, there being an acute angle between the retainer 19 and the adjacent conduit wall. In the event of a back fire from the internal combustion engine through the carbureter and likewise through the air cleaner of sufficient force to expel cleansing liquid through the inlet of the air cleaner, the major portion of such cleansing liquid will hug the conduit wall and be retained or prevented from escaping by the liquid retainer 19. Little or no liquid will be discharged through the center opening of the retainer.

In addition, it is to be noted that the annular retainer 19 does not add to the restriction of incoming air, because the incoming air entering with a rush will have what may be termed a Venturi action, and this air would not tend to occupy the space occupied by the annular retainer, even though that annular retainer were not present. Upon entering the conduit 5, the air will move towards the center of the conduit and will not contact the inner wall of the conduit until it has reached a point below the space occupied by the liquid retainer.

The pre-cleaner above described is also a weather cap. It will be noted that the lower end of the bell-shaped hood 11 terminates below the upper portion of the bell-like part 18, so that precipitation cannot be driven through the screen cylinder and into the conduit 5 by wind or another force.

The collar 17, in this instance, is illustrated in a preferred form as including one integral substantially funnel-shaped structure embodying the bell mouth 18, the collar 17 and the liquid retainer 19. It will, of course, be appreciated that the retainer may be separate from the bell mouth 18, if so desired.

While the air cleaner proper, generally indicated by numeral 1, may be used with the pre-cleaner 2, the air cleaner is equally as efficient when used without the pre-cleaner, as in some instances it may not be necessary to use the pre-cleaner. In such a case, in order to keep restriction as low as possible, it would be desirable to utilize the funnel-shaped structure or collar 17, including the bell mouth 18 and the liquid retainer 19, and in Figure 3 I have illustrated how this structure may be attached directly to the inlet conduit 4 of the cleaner, in the same manner as it is attached to the conduit 5 of the pre-cleaner. Of course, if the pre-cleaner is to be used, the collar 17 is not attached to the inlet conduit 4, as seen in Figure 3.

The air cleaner proper includes a casing comprising a pair of separable sections, an upper section 20 and a lower section 21. The central inlet conduit 4 passes through the top of the upper section 20 to which it may be attached in any suitable manner, such as by spot welding. This conduit extends downwardly inside the casing to a point well below the upper end of the lower section 21. The upper casing section is also apertured and flanged in the side wall thereof, as indicated at 22, to accommodate an outlet conduit 23 leading to the carbureter or other mechanism with which the cleaner is associated. It will be noted that this outlet conduit is belled or funnel-shaped at its inner end, as indicated at 24, in order to lessen restrictions of outgoing air. This upper section 20 may be fabricated from two separate pieces telescopically associated, as indicated at 25 in Figure 7, if so desired, but these initially separate pieces are spot welded or otherwise secured together so that for all intents and purposes the upper section is integral when completed.

With reference to Figures 3 and 7, it will be seen that the upper casing section contains a filter mass 26 disposed between the casing wall and the inlet conduit 4. The filter mass may be wavy wire, curled cattle tail hair or any other suitable substance. A bead 27 or other suitable shoulder forms an upward stop for a relatively heavy screen 28, preferably hardware cloth or the like, which holds the filter mass in position at the upper end thereof, and keeps the mass spaced from the inner end of the outlet 23. An annular collar 29 of arcuate cross-section is spot-welded or otherwise secured to the inlet conduit 4 and projects above the heavy screen 28, as seen in Figure 7. The outer end of this collar rests on the screen 28 and aids in holding it down in proper position so as to eliminate rattling and similar noises. The arcuate formation of the collar defines a dead air space 30 above the screen 28, and such space prevents cleansing liquid, aided by air passing through the cleaner, from climbing the inlet 4 and reaching the empty space above the screen 28 with which the outlet 23 communicates.

At the bottom thereof, the filter mass is also held in place by a downwardly and inwardly sloping screen 31 of the same character as the screen 28. This screen is supported by a spider generally indicated by numeral 32 which includes an inner cylindrical portion 33 which is free from but may be intimately telescoped over the lower end of the inlet conduit 4, as best seen in Figure 6. Adjacent this cylindrical part, the spider is arcuate in shape, as indicated at 34, to provide a bell or funnel-shaped outlet end for the inlet conduit 4, and thereby further reduce restriction in the manner above described. As seen from the showing in both Figures 3 and 7, the spider also comprises a plurality of relatively narrow and widely spaced legs 35 upon which the screen 31 rests. These legs extend from the bell part 34 and communicate with an outside depending flange 36 lying intimately against the inner wall of the casing section 20. The lower end of this flange is turned outwardly, as indicated at 37 (Figure 5), to underlie the lower edge of the casing wall.

This structure of the spider lends itself to an extremely simple manner of assembly, requiring the use of no welding operations or extraneous securing means to hold the parts in their assembled relationship, and hold them tightly against rattling or other noises. The filter mass 26 is first placed in position around the inlet conduit 4 with the screen 28 on top of the mass. The screen 31 is placed beneath the mass, and pushed upwardly until the mass is compressed to the desired extent. The spider is next taken and the cylindrical part 33 thereof pressed over the lower end of the conduit 4 until the upper edge of the part 33 contacts the lower edges of a plurality of detents 38 struck out of the wall of the conduit to limit the upward movement of the spider. The spider is then further forced upwardly, setting up an internal strain inside of the spider, until a plurality of teeth 39 struck from the flange 36 of the spider snap into position in respective apertures 40 in the casing wall 20, as seen best in Figure 5. The spider is then firmly locked in position with an internal tension in the spider sufficient to eliminate rattling and similar noises, and the filter mass is held firmly in place.

Of course, it would be extremely difficult to remove the spider and filter mass, but this should not be necessary during the life of the cleaner. It will be noted that while this structure is exceedingly easy to assemble, no openings for leakage to occur are present. The openings left in the conduit when the detents 38 are struck therefrom are effectively sealed by contact of the cylindrical part of the spider with the lower edge of the detents. Likewise, the openings 40 in the casing wall 20 are effectively sealed because the wall of the lower casing section 21 covers these openings, as seen in Figures 3 and 7.

As seen in Figures 3 and 7, the lower casing section 21 telescopes upwardly over the bottom of the upper casing section to a point defined by a bead 41 in the upper section wall. These sections are removably held together by any suitable means, such, for example, as one or more lugs 42 secured to the lower section 21. The upper portions of the lugs 42 are provided with a suitable form of bayonet slot for engaging over the shank of a bolt 43 projecting from the upper section wall, and upon a relative rotation of the casing sections, the lugs may be anchored over the bolt and held in anchored position by a thumb nut 44. Each lug 42 is also provided with a handle member 45 for engagement by the thumb of the operator to facilitate joining and unjoining of the casing sections. This joining structure is more particularly set forth and described in Milton W. Zander Patent No. 2,004,150, issued June 11, 1935, entitled "Air cleaner."

The lower section 21 defines a sump 46 for a cleansing liquid 47 shown in Figure 7, such as crankcase oil, for example. Above the liquid sump, the lower section is provided with an annular S-bead 48 which may extend entirely around the casing section or not, as deemed desirable, but which forms a suitable shoulder for the support of a baffle held in position by a suitable spring ring 49 or equivalent structure. This baffle may be made in a single piece, as seen in Figure 7, or may be fabricated from a plurality of pieces, as seen in Figure 3. As stated above, the difference between the showings in Figures 3 and 7 resides in the particular baffle.

The baffle construction is one of the most important features of the present invention and contributes particularly to the high efficiency of the cleaner as a whole.

In Figure 3, I have illustrated a baffle generally indicated by numeral 50, Figure 4 illustrating a plan view of the same baffle. In this instance, the baffle is fabricated from two separate pieces of material, the upper piece comprising merely a flat ring 51 which rests on the shoulder defined by the bead 48, and the remainder of the baffle is made from the other piece of material.

The central portion of the baffle is peaked as indicated at 52 in the manner of a cone having arcuate side walls. The apex of the part 52 defines the level of the cleansing liquid and extends upwardly within the belled end 34 on the inlet conduit. The baffle curves in a sweeping arch 53 which terminates in an annular edge 54 from which integral teeth 55 project and are spot welded or otherwise secured to the under face of the aforesaid ring 51, leaving an open space 56 between the baffle and ring, but it will be noted that the ring projects inwardly to overlie this open space and function as a scoop.

Preferably at the bottom of the arcuate part 53, the baffle is provided with a plurality of openings 58 in circular arrangement, each being provided by striking down a portion of the metal, as indicated at 59. With the exception of the two sets of openings, namely, the openings 58 and the series of openings defined by the relatively narrow teeth or lugs 55, the baffle is preferably imperforate. It will be noted that the baffle is shaped so as to define a free and easy course of travel for air passing through the cleaner, and that the baffle will guide this air on its proper path through the cleaner in a smooth, even manner, affording little or no restriction.

In Figure 7, I have shown a baffle made out of a single piece of material, this baffle being designated in general by numeral 60. The baffle includes the peaked central portion 61, the arcuate part 62, and the series of openings 63 at the bottom of the arcuate part, all as previously described. As stated above, this baffle is best suited for cleaners of larger diameter than that shown in Figure 3, and accordingly, the body portion of the baffle need not be arcuate throughout, and the outer portion thereof need only be straight and upwardly and outwardly inclined as indicated at 64. This inclined part terminates in an integral ring flange 65 which rests upon the shoulder defined by the bead 48 beneath the spring ring 49. Adjacent the ring flange part, the baffle is provided with a series of preferably wide openings 66 formed by striking out a portion of the baffle material, which portion 67 is preferably left parallel with the ring flange 65 to function as a scoop.

It will be understood that, if so desired, the baffle 60 may be made from separate pieces, as the baffle 50, or the baffle 50 may be made from a single piece of material, the preferable form being the fabricated baffle, due to economy in manufacture. Since both baffles function in substantially the same manner, the operation of the cleaner will be described in connection with the showing in Figure 7, taken in conjunction, of course, with Figure 2.

With the pre-cleaner mounted upon the inlet of the air cleaner, air enters beneath the bell hood 11 of the pre-cleaner, passes through the screen cylinder, and descends through the conduit 5 of the pre-cleaner, entering the cleaner proper downwardly through the inlet 4. As seen clearly in Figure 7, the sump liquid 47 seals off the passage of air, and a material quantity of this liquid is maintained in the hollow defined by the arcuate portion of the baffle. Assuming that the air cleaner is associated with an internal combustion engine, as soon as the engine is started, creating a suction through the cleaner, the major part of liquid held in the hollow portion of the baffle will be forcefully and suddenly thrown upwardly into the filter mass, thereby impregnating the mass to the proper and desired extent almost immediately upon starting the engine. This initial impregnation of the filter mass occurs substantially with the suddenness of an explosion. The suction created will cause the air to gradually propel this portion of the cleaning liquid upwardly, and after the liquid is pushed by the lower part of the bell formation 34, the liquid is thrown into the filter mass in a sudden spurt akin to that of an explosion. This impregnation is enhanced further during the immediately ensuing action of the cleaner, and long before the engine reaches its normal operating speed, the proper impregnation of the filter mass has occurred. This impregnation will remain substantially constant during all normal operating speeds of the engine, and will only rise when the engine is driven near its maximum horsepower output.
As the air continues to pass through the cleaner, sump liquid will be educed through the openings 63 and the major portion of the dirt removed from the air by comminglement with this educed sump liquid. Upon receiving impurities from the air, this educed sump liquid becomes heavy and will therefore hug the upper surface of the baffle and be pushed up and out through the openings 66, the scoop action of the part 67 aiding in returning this dirt laden sump liquid back to the sump, somewhat in the manner indicated by the heavy arrows 68.

Of course, a part of the educed sump liquid will not be so heavily laden with dirt and would be carried upwardly into the filter mass with the traveling air. The remainder of the dirt carried by the air will be removed therefrom within the filter mass, and consequently some of the liquid in the filter mass will become dirt laden. This liquid will tend to hug the outer wall of the inlet conduit 4 and gravitate downwardly falling on the baffle across the path of the incoming air and so be transferred back into the sump through the opening 66 in the manner above described.

In the event any comparatively clean liquid returns from the filter mass, this liquid may fall either immediately adjacent the inlet conduit or further outwardly through the screen 31 directly in the path of incoming air so as to insure a positive comminglement of air with cleansing liquid.

Due to the action indicated by the arrows 68, the baffle will never become substantially dry, because almost constantly there will be an eduction of sump liquid through one or more of the openings 63.

It will be noted that during the caurse of operation of the cleaner, restriction is materially kept down, because of the arcuate or funnel-like inlet 18, the similar structure 34 at the bottom end of the inlet conduit 4, and the similar construction 24 on the inner end of the outlet conduit 23. Consequently, the air does not have to pass sharply around any square corners, but has a smooth and easily followed path defined for it through the entire cleaner.

As stated above, in the event the pre-cleaner is not used, it will be desirable to incorporate the funnel collar 17 on the inlet conduit of the cleaner, as ilustrated in Figure 3.
In Figures 8 and 9, I have shown a very simple and exceedingly economical structure centering around the inlet conduit to the cleaner and providing for the attachment of a pre-cleaner. In some instances, difficulty is experienced in installing an air cleaner equipped with a pre-cleaner due to the aperture necessary in the cowl or hood of the engine, and also manufacturing expense rises when a separate conduit is used in the pre-cleaner for telescopic engagement with the conduit on the air cleaner. In some instances, further, it is desirable to use lockseam tubing as a conduit and it is very difficult to effect a proper telescopic engagement between two sections of lockseam tubing.

Accordingly, in Figures 8 and 9 I have provided a single conduit for the air cleaner of sufficient length for the precleaner to seat upon the top thereof, there being no need for a separate conduit depending from the pre-cleaner.

Details of the air cleaner and pre-cleaner constructions not specifically mentioned hereinafter are the same as above described. In this instance, however, the air cleaner is equipped with an inlet conduit 4a, which may be in the form of seamless tubing as above described or in the form of lockseam tubing as illustrated in Figure 9, the lockseam being indicated at 69. This conduit is attached to the air cleaner in the manner above described, but is of sufficient length to extend upwardly above the hood or cowl of the vehicle and inside the pre-cleaner. The attaching means for holding the pre-cleaner in position on the conduit are, in this case, associated with the conduit. These means include an S-yoke 14a having its ends spot-welded or equivalently secured to the conduit and being equipped with a stud or bolt 15a which extends through the closed top 12 of the pre-cleaner and a lock or thumb nut 16a engaged with the bolt outside the pre-cleaner to hold the parts assembled.

With reference to Figure 8, it will be seen that the pre-cleaner differs from the above described construction in the lower flange part. In this instance, the pre-cleaner is provided with a lower ring 70 having an upwardly extending outer circumferential flange 71 to hold the screens 9 and 10 in proper position, and a longer inner circumferential flange 72 also extending upwardly and of a proper size to telescope intimately over the upper end of the conduit 4a. A collar 17a having a bell-like mouth 18a and an interior obliquely extending liquid retainer 19a as and for the purposes above described is, in this instance, spot welded or otherwise secured to the inner face of the flange 72. This flange 72, of course, functions in the nature of an outlet for the pre-cleaner but is the only outlet construction built into the pre-cleaner, the conduit 5 described in connection with Figures 1 to 7, inclusive, being eliminated.

The attachment of the flange 17a to the conduit flange 72 results in the provision of a circumferential inverted V-shaped groove 73. Provision for the reception of the lockseam 69 inside the liquid retainer 19a may be had in an obvious manner by making a slight hump in the retainer.

When it is desired to connect the pre-cleaner to the air cleaner, it is a simple expedient to seat the pre-cleaner on top of the conduit 4a which enters the inverted V-notch 73, and due to the cylindrical flange 72, a tight and positive connection is established in a very simple manner. The connection is retained, as explained above, by means of the bolt 15a and thumb nut 16a. With the use of this construction, it is only necessary to have an aperture in the cowl or hood of the vehicle sufficient to intimately accommodate the conduit 4a, and it will not, under usual circumstances, be necessary to use a bushing or flange in that aperture. It will be further appreciated that the structure shown in Figures 8 and 9 may be very economically manufactured.

From the foregoing, it is apparent that I have provided a novel combination air cleaner and pre-cleaner construction, wherein the use of a pre-cleaner does not detract further from the effective horsepower output of the engine. It is also apparent that the cleaner proper may be readily and easily assembled in an economical manner, is highly efficient in character, and provides a minimum amount of cleaner restriction to the air.

I claim as my invention:

1. In an air cleaner, a casing having an inlet and an outlet, said casing also having a sump for cleansing liquid, and a baffle associated with said sump and positioned so that air traveling through said cleaner will pass over said baffle, and said baffle having separate sets of openings, one set of openings being positioned for the eduction of sump liquid therethrough by passing air, and scoop means associated with the other set of openings to aid the return therethrough of dirt-laden liquid to the sump.

2. In an air cleaner, a casing having an inlet and an outlet, said casing also having a sump for cleansing liquid, and a baffle disposed contiguously to the liquid in said sump shaped to guide the passing air smoothly through the cleaner, said baffle having an opening for eduction of sump liquid therethrough, and scoop means intimately associated with said baffle to remove dirt laden liquid from passing air as the air leaves the baffle.

3. In an air cleaner, a casing having an inlet and an outlet, said casing also having a sump for cleansing liquid, filter means above said sump, and a baffle shaped to hold a quantity of sump liquid directly in the path of incoming air for immediate expulsion into said filter means, said baffle blocking off said sump from the region thereabove except for eduction openings and discharge openings, and scoop means associated with said discharge openings.

4. In combination, a liquid bath air cleaner, an inlet conduit extending outside said air cleaner, and a structure including a conduit-like portion and a liquid retaining flange associated in a manner to provide a tapering groove therebetween for the reception of the end of said conduit.

5. In an air cleaner, a casing having a liquid sump therein, means adjacent said sump defining a smooth direct path through the casing for incoming air, said means having an opening through which sump liquid is educed by air following said path, and scoop means projecting directly into said defined path to scoop dirt-laden liquid from air following along said path, and structure associated with said scoop means arranged to provide an opening adjacent said scoop means and leading to said sump.

6. In an air cleaner, a casing having a liquid sump therein, means adjacent said sump defining a smooth direct path through the casing for incoming air, said means having an opening through which sump liquid is educed by air following said path, scoop means projecting directly into said defined path to scoop dirt-laden liquid from air following along said path, and means arranged to guide incoming air along said path and against said scoop means, and structure adjacent said scoop means defining an opening leading to said sump.

7. In an air cleaner, a casing having an outlet, a filter mass in said casing, an inlet conduit extending through said mass, a tongue struck from said conduit, a spider to support said mass and disposed in end to end abutment with said tongue, said casing having an opening, and a resilient tongue struck from said spider and engaged end to end with a wall of said opening after said spider is pressed into position, the engagement being such as to prevent removal of the spider.

8. In an air cleaner, a casing having an outlet, a filter mass in said casing, an inlet conduit extending through said mass, a tongue struck from said conduit, a spider to support said mass and disposed in end to end abutment with said tongue, said casing having an opening, and a resilient tongue struck from said spider and engaged end to end with a wall of said opening after said spider is pressed into position, the engagement being such as to prevent removal of the spider, and said spider being retained under tension as a result of said abutment and said engagement.

9. In an air cleaner, a casing having a liquid sump therein, a curved baffle contiguous to the liquid in the sump and substantially partitioning the casing transversely, means to guide incoming air over said baffle, said baffle having openings through which sump liquid may be educed by passing air, said baffle also having openings spaced from the first said openings, and scoop means associated with the latter openings to return dirt laden liquid to the sump.

10. In an air cleaner, a casing having a liquid sump, a center tube inlet extending well within said cleaner, a baffle below said inlet contiguous to the liquid in the sump and extending substantially transversely of the casing, said baffle having a raised part confronting the opening of said inlet and a concave part therearound, said baffle having eduction openings in said concave part and other openings spaced outwardly from the first openings and through which dirt laden liquid may return to the sump.

11. In an air cleaner, a casing having a liquid sump, a center tube inlet extending well within said cleaner, a baffle below said inlet contiguous to the liquid in the sump and extending substantially transversely of the casing, said baffle having a raised part confronting the opening of said inlet and a concave part therearound, said baffle having eduction openings in said concave part and other openings spaced outwardly from the first openings and through which dirt laden liquid may return to the sump, and scoop-like means projecting into the air stream adjacent said other openings to scoop dirt-laden liquid into the openings.

12. In an air cleaner, a casing having a liquid sump therein, a generally concave baffle positioned across said sump and having a peaked part, an inlet tube extending into said casing and terminating over said peaked part of the baffle, the initial liquid level being such as to seal off the passage between said inlet and said baffle, and said baffle having openings in a low portion thereof through which sump liquid may be educed by traveling air and other openings spaced from the eduction openings and in a higher part of the baffle away from said peaked part through which dirt laden liquid may return to the sump, and inwardly projecting scoop means above the latter openings.

13. In an air cleaner, a casing having an outlet, air cleansing means in said casing, inlet conduit means entering said cleaner, and a collar member inserted in said conduit means, the outer end of said collar being shaped to define a belled inlet for the conduit means, and a flange on the inner end of said collar sloping toward the axis of the conduit means.

14. In an air cleaner, a casing containing cleansing means and having an outlet, an inlet conduit opening into said casing, and means associated with the outer end of said conduit including a liquid retaining flange extending in said conduit and a flared outer portion defining an inlet to the conduit.

15. In an air cleaner construction, a cleaner assembly including a tubular portion, and a sloping flange in said tubular part and connected thereto in a manner to provide a groove therebetween for the reception of a conduit end to which said assembly may be connected.

THEODORE W. HALLERBERG.